Aug. 6, 1940.  J. W. REED  2,210,818
SEPARATING PROCESS AND APPARATUS
Filed April 14, 1939   4 Sheets-Sheet 1

Inventor
JOSEPH W. REED
By Norris & Bateman
Attorneys

Aug. 6, 1940.   J. W. REED   2,210,818
SEPARATING PROCESS AND APPARATUS
Filed April 14, 1939   4 Sheets-Sheet 3

Inventor
JOSEPH W. REED
By  Norris + Bateman
Attorneys

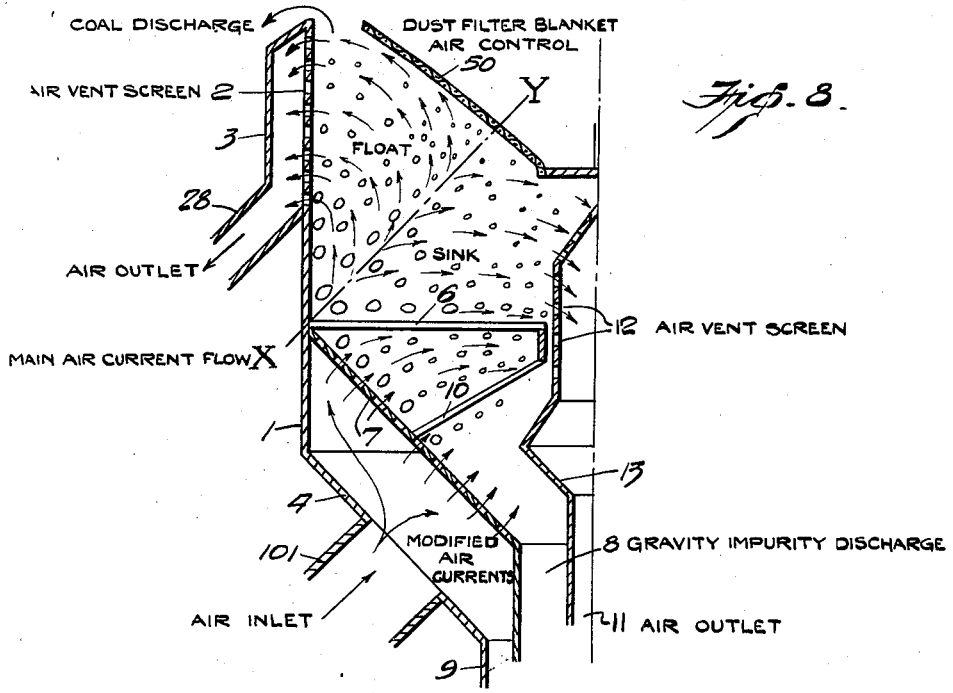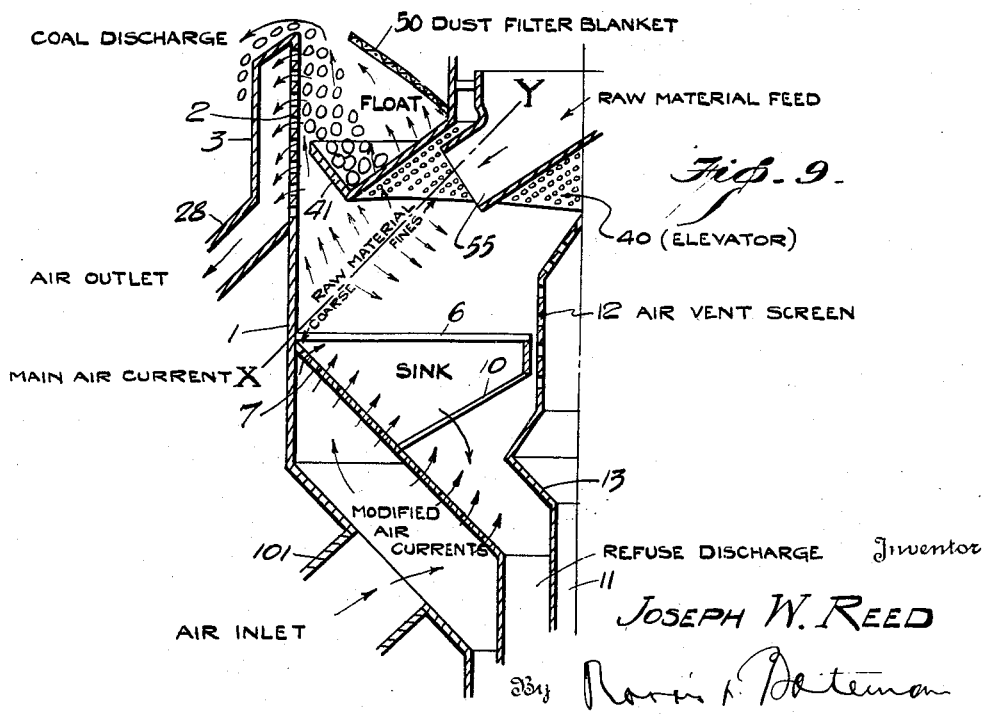

Patented Aug. 6, 1940

2,210,818

UNITED STATES PATENT OFFICE 2,210,818

SEPARATING PROCESS AND APPARATUS

Joseph W. Reed, Fairmont, W. Va.

Application April 14, 1939, Serial No. 267,862

33 Claims. (Cl. 209—475)

The present invention relates to a process of and apparatus for separating crushed coal and like material, and the primary object of the invention is to enable uniformly effective and efficient separation of all sizes of the raw material operated upon to be obtained, the present invention being an improvement upon that disclosed in my prior Patent No. 2,014,291 granted September 10, 1935.

Difficulties are presented by the fines in the cleaning of coal and the concentration of ores, which heretofore have been overcome only to a limited degree. In using wet methods in the washing of coal containing intermingled constituents, the very fine heavy material floats off with the fine light material, forming a sludge, and likewise, in the wet concentration of ores, the very fine concentrates float off with the slimes, causing losses of valuable constituents. In a somewhat similar manner when using dry or air operated processes, difficulties have been encountered in the complete wide size range processsing of all the sizes found in crushed raw materials, and a limit is reached toward the pulverized constituents beyond which size separation becomes imperfect, such imperfection of separation embracing a sufficient quantity of the raw material as to severely affect recovery values.

It has been common in pneumatic separators of the prior art, to modify the air in various ways, in some instances with a directive impulse at the point of entrance of the air into the material, but in all instances the air passes through the material by the shortest upward path of least resistance and escapes through the surface of the material into an air chamber. As the air leaves the material, it is free to pick up and carry with it such fine material or dust and fragments as the air current, depending on its intensity, will lift, the air thus removing raw material from the separator bed without processing or separating the constituents. The raw material thus raised into the air like a dust cloud may later fall to the surface of the processed material or drift out with the exhaust air from the chamber above the separator, and obviously such removal of raw material precluded a complete separating action upon all sizes when operating upon a wide size range extending from substantially zero size up to the larger sizes, so that heretofore, the fines have been only imperfectly separated in wide size range separation, and moreover, the efficiency of separation of the fines decreased as they approached the size at which separation ceased.

The present invention overcomes these difficulties, it providing a process and apparatus for separating crushed material in which the valuable constituents are within one specific gravity range and the undesired constituents lie within a different specific gravity range whereby the constituents are split as plus or minus an intermediate specific gravity at which the valuable constituents are separated and recovered from the less valuable or undesired constituents as, for example, the separation of low ash coal from slightly heavier high ash coal, bone, rock and like impurities.

The invention is primarily applicable to dry or pneumatic cleaning, concentration or separation but is not limited to air as the flotation medium since, by pumping other fluid such as water through the fluid passages of the apparatus, the apparatus and the process accommodate themselves to heavier than air flotation with similar results in separation of the constituents over similar size ranges, the moisture added to the finished products being readily removable by any of the well known commercial devices available for that purpose.

According to the present invention, the raw material is so entered, sized, separated and removed that the resultants are a light product and a heavy product comprising all the sizes in the crushed raw material treated, these products being split with exactness as plus or minus a given specific gravity, the constituents of one product being within one specific gravity range and constituting a valuable product, and the constituents of the other product being of a different specific gravity range and constituting the undesired product. The splitting of the constituents at such an intermediate specific gravity separates the valuable from the undesired constituents in all sizes of the raw material, such for example, as crushed or raw coal as it comes from the mine and which contains constituents ranging from dust through an ascending size range to the largest size it is desired to treat, the desired coal being separated as "float" from the slightly heavier "sink" such as high ash coal, bone and rock impurities through a wide size range of separation at a definite specific gravity in all sizes whereby all valuable portions of the raw coal are recovered.

According to another feature of the invention, the range of the process is extended to cover a wide density variation of raw material such, for example, as mixtures in which the impurity predominates, by varying the rates of discharge of float and sink in accordance with variations of specific gravity of the raw material whereby the float and sink rates of discharge balance the amounts of float and sink composing the raw material, and increasing the period of time for the separation and decreasing the rate of feed of raw material as the impurity increases, and by concurrently neutralizing the effects of variations in the mixture of raw material upon the related degrees of buoyancy of the sink and float zone whereby any trend from normal so governs the inflow of the flotation fluid as to return the buoyancy to the exactness to which it is adjusted to produce the desired specific gravity splitting, whereby the splitting point remains fixed through all specific gravity variations which may occur in the raw material under treatment.

Other features of the process and of the apparatus will become apparent from the following description.

The preferred form of apparatus for carrying out the invention is disclosed in the accompanying drawings wherein:

Fig. 2 is a view similar to Fig. 1 but showing the parts in the positions they assume upon an increase of specific gravity in the raw material fed into the apparatus;

Fig. 8 is a view showing diagrammatically the different paths of the lighter constituents or float and the heavier constituents or sink; and Fig. 9 is a view showing diagrammatically the manner of feeding the raw material.

Similar parts are designated by the same reference characters in the different figures.

Figure 6:
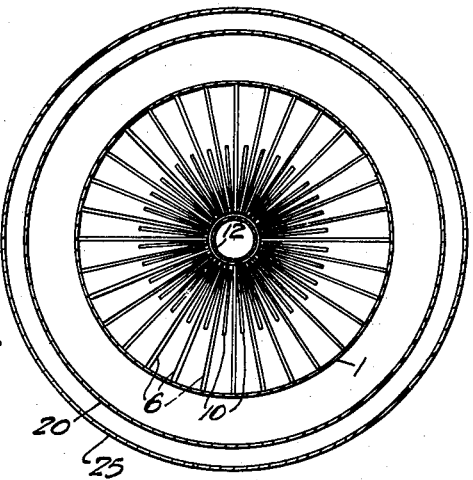
Fig. 6 is a horizontal section taken on the line 6—6 in Fig. 5.
Figure 7:
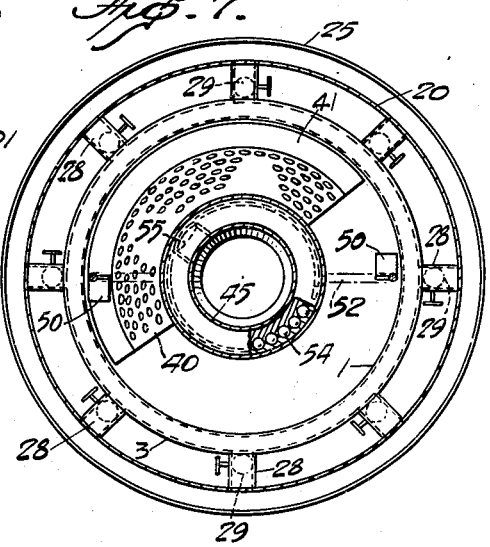
Fig. 7 is a horizontal section taken on the line 7—7 in Fig. 5.

The apparatus, as shown in the present instance, comprises a separating chamber 1 the upper portion of which is preferably cylindrical in form and is formed near its upper edge with perforations 2 which provide a screened air or fluid outlet, the upper perforated portion of the separating chamber being surrounded by an annular shield 3, and the lower portion of the separating chamber comprises a conical bottom 4 which has a tubular conduit 5 extending downwardly therefrom. A horizontal screen 6 is mounted in fixed position within the separating chamber, this screen being composed of a circular series of radial bars as shown in detail in Fig. 6, and beneath this screen is mounted a conical screen plate 7 which is spaced above the imperforate bottom 4 and the perforations in which provide passages for the flow of air or fluid therethrough. The lower end of the perforated conical screen 7 terminates in a tubular conduit 8 which projects downwardly into and is spaced from the surrounding walls of an enlargement 9 formed in the upper end of the conduit 5. Below the horizontal screen 6 is mounted a conical lower screen 10 which is composed of radial bars the inner ends of which are fixed to the center of the screen 6 and the outer ends of which slope downwardly and are fixed to the perforated screen 7, the bars 10 of the lower radial screen being staggered or in alternating relation to the bars of the upper screen 6. An air vent conduit 11 extends upwardly through the conduits 5 and 8, preferably coaxially therewith, and is provided at its upper end with a substantially cylindrical screen 12 which is arranged centrally of the screens 6 and 10 and projects above them, the screen 12 having a conical perforated top. The conduit 11 is formed with a bulge or enlargement 13 the upper and lower sides of which are conical, the lower side of this bulge or enlargement being parallel to and concentric with the perforated bottom or screen 7. A valve plate 14 is fixed to the conduit 5 in spaced relation below its lower end, as by legs or rods 14ª, and the conduit 11 is supported by fixing it in the plate 14. A discharge controlling damper 15 is provided in the conduit 11, it being operable by a hand wheel 16.

The separating chamber 1 is surrounded by a casing 20 the upper portion of which is preferably cylindrical and forms an annular space between it and the upper portion of the separating chamber, and the lower portion of this surrounding casing is formed as a conical bottom 21 the lower end of which terminates in a tubular conduit 22 which discharges into a branched chute 23. The casing 20 is also preferably surrounded by an outer casing 25 which forms an annular space between these casings, and the lower portion of the outer casing has a conical bottom 26 which discharges into a chute 27. A suitable number of outlet conduits 28 extend from the bottom of the shield 3 to the annular space between the casings 20 and 25, and these conduits are provided with dampers 29 for controlling the discharge of fluid or fluid and material therethrough. A hopper 30 is supported by the corners of the plate 14 to receive material discharged therefrom and to direct it onto a conveyor belt 31 or other receiving means, and the conduit 11 extends preferably through this hopper and is arranged to discharge material onto a conveyor belt 32 or other suitable receiving means. The chute 23 is arranged to discharge material onto a conveyor belt or other suitable receiving means 33 and the chute 27 is arranged to discharge material onto a conveyor belt or other suitable receiving means 34. Within the hopper 30 is arranged a sleeve 35 which surrounds the lower end of the conduit 5, this sleeve being supported in fixed position within the frame 36 of the apparatus, as by a cross member 37. The valve plate 14, which is movable vertically as will hereinafter appear, is movable into and out of engagement with the lower end of the sleeve 35.

The upper portion of the separating chamber 1 contains a revoluble elevator for the material therein, it being of semicircular form and having the shape of a spiral. It comprises a central conical portion 40 which is perforated for the escape of air therethrough and a marginal upturned flange 41 of inverted cone shape, thus forming a trough between it and the central portion 40. This elevator is supported to rotate axially within the separating chamber by rods 42 which extend upwardly and are fixed to the lower end of a sleeve 43. This sleeve is revolubly mounted, as by ball bearings 44, upon the lower tubular end 45 of a chamber 46, the latter being supported on the casing 20 as by a bracket 47, and the sleeve 43 is provided with a pulley 48 or other suitable means for rotating it. Above the elevator 40, 41 is mounted a blanket 50 which is air resistant and dust proof and is preferably flexible, it being composed, for example, of an upper tightly woven fabric and a lower wearing surface of canvas provided on its under surface with perforated metal disks or other flexible wear-resisting sheathing. This blanket is adapted to rest or float upon the surface of the material contained in the separating chamber. This blanket is of a diameter less than that of the separating chamber to provide an annular space between its periphery and the rim or top of the separating chamber, and a pair of scoops 51 which are curved to produce a lifting effect are mounted to rotate in this annular space, the scoops being connected for example by arms 52 to a ring 53 which is in the form of a pulley and is rotatably mounted preferably by ball bearings 54 on the sleeve 43. The elevator 40, 41 has secured to it a material feed chute 55, this chute having a central portion which is coaxial with and fits closely around the lower end of the discharge tube 45 of the chamber 46, the feed chute having an orifice which is below and inclines downwardly on a radius midway between the leading and trailing edges of the elevator 40, 41, the feed chute maintaining this relation with the elevator while it rotates therewith.

The body of the chamber 46 is larger than its discharge tube 45, thus providing a reservoir for the material fed into it, and the upper end of this chamber is formed with a tubular inlet 60 which telescopes loosely over the tubular discharge end 61 of a feed hopper 62, the latter being mounted in fixed position in the upper portion of the frame.

The separating chamber is supported in the frame for limited vertical movement by a balance beam 65 which is fulcrumed on the frame by knife edges 66, the separating chamber being suspended from one end of the balance lever by knife edges 67 which may be fixed to the bracket 47, and the other end of the balance lever is provided with a tare weight 68 which is adjusted to balance the weight of the separating chamber when empty. An adjustable counterpoise 69 is mounted slidably on the balance lever, this counterpoise being of appropriate weight and its adjustment along the balance lever controlling the point at which the lighter and heavier constituents of the material will be split. A pendulum 70 is also mounted adjustably on the balance lever, this pendulum carrying a weight 71 which opposes descent of the separating chamber.

Figures 1, 3:
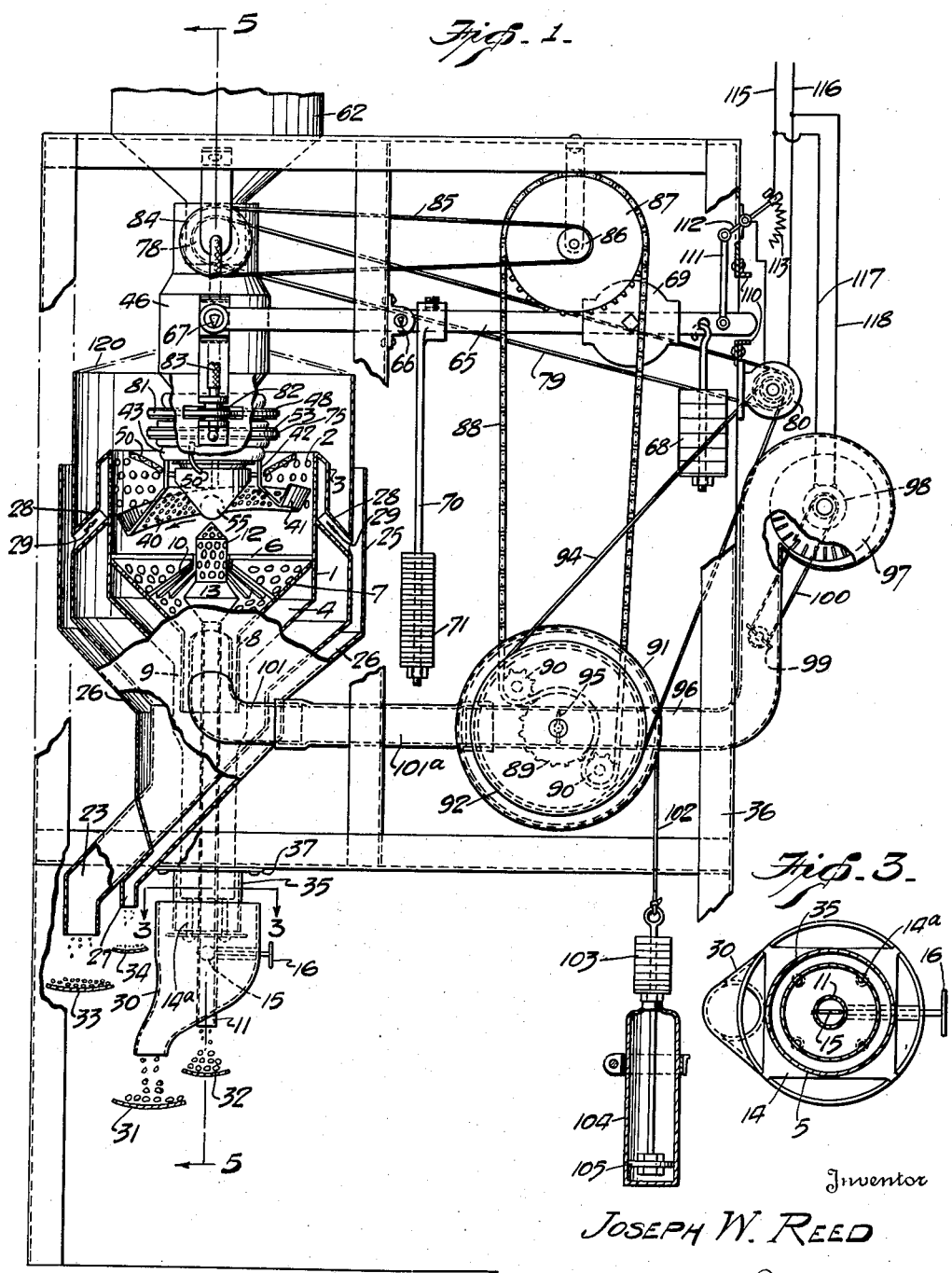
Fig. 1 is a side elevation, partly in section, of a separating apparatus for carrying out the present invention, the parts being shown in position for normal operation.
Fig. 3 is a detail horizontal section taken on the line 3—3 in Fig. 1.
Figure 4:
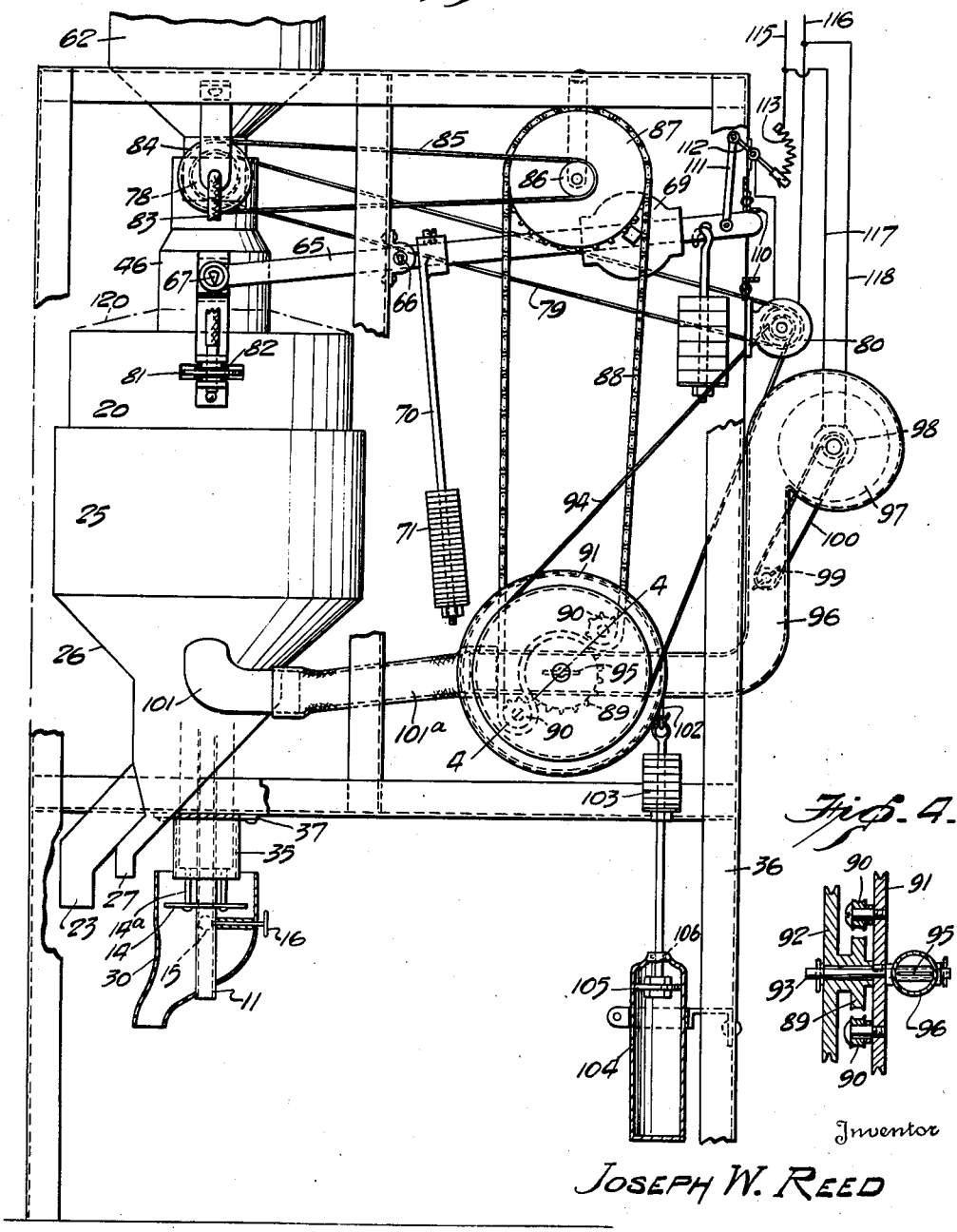
Fig. 4 is a detail section taken on the line 4—4 in Fig. 2.
Figure 5:
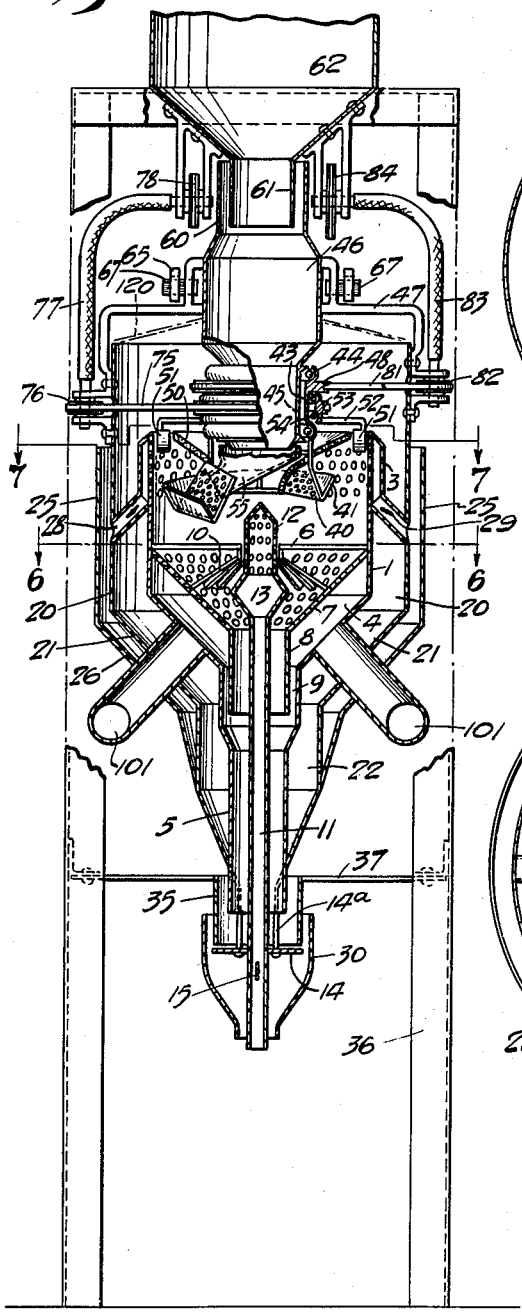
Fig. 5 is a vertical section taken on the line 5—5 in Fig. 1.

The scoops 51 are driven by a belt 75 which passes around the pulley 53 and a pulley 76 mounted in the bracket 47, the latter pulley being connected by a flexible shaft 77 with a pulley 78, the latter being connected by a belt 79 to a variable speed electric motor 80. The rotatable elevator 40, 41 is driven from its pulley 48 by a belt 81 which passes around a pulley 82, the latter being mounted in the bracket 47 and connected by a flexible shaft 83 to a pulley 84, the latter being connected by a belt 85 to a pulley 86, this pulley being connected to a larger pulley 87 mounted in the frame of the machine, and the pulley 87 is driven by a chain belt 88 which in turn is driven by a pulley 89. The belt 88 however also passes around a pair of idler pulleys 90 which are mounted on a pulley 91 at diametrically opposite sides of the axis of the pulley 89. The pulley 89 is connected to a pulley 92, the pulleys 89 and 92 being mounted loosely on a shaft 93, and the pulley 92 is driven by a belt 94 from the variable speed motor 80. The shaft 93 has a damper valve 95 and pulley 91 fixed thereto, this valve being located in a conduit 96 through which fluid such as air is forced by a blower or pump 97, the latter being driven by suitable means such as an electric motor 98. The fluid forced through the conduit 96 is caused to pulsate by a rotatable damper-like interrupter 99 which is mounted in this conduit and driven continuously as by a belt 100, from the blower 97. The air or fluid is delivered by the conduit 96, under control of the valve 95, to branch conduits 101 which lead into the space between the bottom 4 of the separating chamber and the perforated bottom or screen 7 above it. In order to permit vertical movements of the separating chamber without interference from these air or fluid conduits, the conduit sections 101 are connected to the main conduit 96 by a flexible hose 101$^a$ or other suitable form of connection which permits vertical movements of the separating chamber. A cable 102 is attached to the pulley 91 and extends around its periphery, and a weight 103 is suspended from this cable, this weight normally occupying its lower position as shown in Fig. 1 when the resistance to the rotation of the elevator 40, 41 is normal and being lifted into the position shown in Fig. 2 when the torque required to drive the elevator 40, 41 increases abnormally. In order to prevent sudden movements of the air controlling valve 95, a dash pot is preferably connected to the cable 102, this dash pot as shown comprising a cylinder 104 secured in fixed position on the frame and having a piston 105 reciprocating therein, the piston being connected to the lower end of the weight 103, the lower end of the cylinder being closed and its upper end being closed by a suitable packing 106, a small amount of fluid leakage past the piston being provided for to cause an even movement of the air controlling valve when rotated toward open or closed position. By this arrangement, the effort or power applied in rotating the spiral elevator in the material contained in the separating chamber imposes tension on the right hand side of the belt 88 (Fig. 1), and this tension applied to the right hand idler pulley 90 tends to rotate the pulley 91 in an anti-clockwise direction against the action of the weight 103. When the resistance to the rotation of the spiral elevator increases, as when the impurities or heavier constituents therein increase, the pulley 91 is rotated against the action of the weight 103 to open the air valve 95 and when the resistance to the rotation of the spiral elevator diminishes, as when the impurities or heavier constituents in the raw material diminish, the weight 103 rotates the pulley 91 in the opposite direction to close the air valve, thus increasing or decreasing the amount of air supplied to the separating chamber according to the buoyancy of the material therein. By adjusting the amount of the weight 103, any desired buoyancy may be produced and maintained accurately in the separating chamber, through a wide range of variation of the relative amounts of light and heavy constituents composing the raw material.

The balance beam 65 has a limited amount of movement between fixed stops 110 on the frame, and the balance beam is operatively connected, as by a link 111, to the controlling arm 112 of a rheostat or other speed controller 113 for the variable speed motor 80. When the separating chamber is in its normal or elevated position, the rheostat or controller is set for the normal speed of the motor 80, but when the separating chamber descends, as when the specific gravity of the raw material fed into it increases, the increased weight thus imposed on the balance beam swings the free end thereof upwardly until the separating chamber is balanced by the pendulum weight 71, and such movement of the balance beam operates the rheostat or controller 113 as by cutting in the resistance thereof, as indicated in Fig. 2, to reduce the speed of the motor 80 and consequently the speed of the spiral elevator and revolving scoops.

The motors 80 and 98 may be supplied with electrical energy by conductors 115 and 116 connected to any suitable source of electrical energy, the rheostat or controller 113 being connected in the circuit of the variable speed motor 80 as shown for example in Figs. 1 and 2, the conductors 117 and 118 which supply current to the fan or blower motor 98 being connected to the conductors 115 and 116 independently of the rheostat or controller so that the fan or blower will operate continuously at substantially constant speed.

In carrying out the present invention with an apparatus constructed as hereinbefore described, the raw material containing light and heavy constituents to be separated, such as crushed or raw coal as it comes from the mine, is fed by the hopper 62 into the chamber 46 and from the latter, the material flows by gravity through the feed chute 55 into the separating chamber 1. During the operation of the apparatus, the motor 80 operates to rotate the spiral elevator 40 continuously in the direction indicated by the arrow in Fig. 1 so that the lower end of this semi-circular elevator will be presented at the leading edge thereof and the elevator will operate to lift the material in the separating chamber, and the scoops 51 will be rotated continuously and will act to lift the material which reaches the upper rim of the separating chamber. The motor 98 will also operate to force air or fluid through the duct 96 into the space beneath the perforated bottom or screen 7 in the separating chamber, the rotating interrupter 99 acting to produce pulsations of air or fluid.

The tare weight 68 balances the weight of the empty separating chamber and the parts associated therewith and suspended from the balance beam, and the counterpoise 69 is adjusted along the beam according to the point at which the lighter and heavier constituents are to be split. The pendulum weight 71 is of an amount sufficient to balance increases of weight of the material in the separating chamber throughout the range of variations of specific gravities of the material to be operated upon in the separating chamber.

While the separating chamber is in its normal elevated position, as shown in Fig. 1, the valve plate 14 connected to the lower end of the discharge conduit 5 is in relatively closed relation with the lower end of this conduit, keeping said conduit filled with material and preventing escape of air from its lower end, and the spiral elevator and scoops operate at their highest speed and the supply of air or flotation fluid to the separating chamber is relatively reduced by the valve 95 which is then in its relatively closed position. By moving the counterpoise 69 toward the fulcrum of the balance beam, a more rapid discharge of the heavier constituents of the material through the conduit 5 will take place so that the material will be split at a lower specific gravity; and by moving this counterpoise toward the outer or free end of the balance beam, discharge of the heavier constituents of the material through said conduit will be lessened so that the material will be split at a higher specific gravity.

Rotation of the spiral elevator 40 in the material contained in the separating chamber causes it to act as a screw, lifting the material above it and leaving a mound of the heavier material below it and supported on the radial screens 6 and 10. Since the feed chute 55 rotates with the spiral elevator and its discharge orifice is beneath the elevator and midway between its leading and trailing edges, it will feed raw material into the space formed by the elevator by lifting the material above it. Such lifting of the material in the separating chamber and the feeding of raw material into the space thus formed takes place in cycles as the spiral body of the elevator and the discharge orifice of the feed chute travel in an orbit, so that an interval of time elapses between the successive insertions of the raw material, at any given point in the orbit.

The air entering the separating chamber under pressure beneath the perforated bottom 7 thereof is directed with its greatest intensity at the point X and flows through the material in a direction diagonally upwardly and inwardly substantially along the line X—Y toward the filter blanket 50, as indicated diagrammatically in Fig. 8, which line conforms substantially with the incline of the lower side of the central portion 40 of the spiral elevator. The air current is modified however into an upward and outward eddy current which is split or diverted toward the air vents 2, and an inward current is split or diverted toward the central air vent 12. By appropriate setting of the dampers 29 and 15 in the respective air outlets, the relative amounts of air diverted to the respective air vents 2 and 12 and the point Y where the final splitting of the material takes place may thus be moved upwardly or downwardly until the desired slope is obtained for the line X—Y, which is the path along which the main current of air flows and from which the air splits to flow to the air vents 2 and 12. Building up of the air pressure within the separating chamber by the dust filter blanket 50 which floats on the surface of the material through which the air may pass only to a restricted degree, and reduction of resistance to the escape of air at the air vents enable the air flow through the separating chamber to be split, directed and modified to effect the desired separation of the constituents of the material.

The lighter constituents of the material carried above the line X—Y by the respective air current, are carried to the upper surrounding edge or rim of the separating chamber by this air current which escapes through the vents 2, such lighter constituents discharging over the rim, assisted by the lifting action of the spiral flange 41 of the elevator and by the revolving scoops 51. These lighter constituents drop through the space between the separating chamber and the surrounding casing 20 and descend through the chute 23 onto the travelling belt 33 or other suitable receiving means. The air vented through the perforations 2 escapes through the outlets 28 under control of the dampers 29 therein. These perforations 2 may be made sufficiently small to permit discharge substantially of only air, but these perforations are preferably made of a size to permit the passage therethrough of fines of the desired size whereby, as the float comprising the lighter constituents pass upwardly under the influence of the air current, they pass outwardly through these perforations and discharge into the space between the casings 20 and 29 from which they discharge through the chute 27 onto the travelling belt 34 or other suitable receiving means, while the sizes of the float which are larger than these perforations pass upwardly and are discharged over the rim of the separating chamber.

The sink comprising the heavier constituents, passes into the mound of material left below the revolving elevator, passes downwardly through the radial screens 6 and 10, the larger sizes passing through these screens toward their peripheries due to the tapered form of the openings therein, and the bed of sink below these screens, which is retained by these screens in a quiescent state, acts to resist the upflow of air through the perforated bottom 7, causing the air to enter most vigorously toward the top or periphery of the perforated bottom 7 and to flow with diminishing force toward the center. The perforated bottom 7 provides a downwardly sloping surface over which the sink gravitates and the sink then descends into the discharge conduit 5 and keeps said conduit filled under control of the valve plate 14, thus preventing escape of air from the lower end of said conduit. The bulge 13 in the conduit below the central air vent functions to retard the vertical descent of the central portion of the sink to balance the friction or equal the resistance to the descent of the outer portion of the sink on the sloping bottom 7, and to move the material in the mound left beneath the line X—Y without breaking up the mound or altering its general shape as the material moves inwardly and downwardly and concentrates and accelerates on its way to the conduit 5. The perforations in the central air vent 12 may be made sufficiently small to permit the discharge of air only, under control of the damper 15, but these perforations may be made sufficiently large to permit passage therethrough with the air of fines of a desired size and discharge thereof through the central conduit 11 onto the travelling belt 32 or other receiving means, the sink of larger sizes descending past the central screened air vent into the discharge conduit 5 and discharging from the lower end thereof.

The splitting of the float or lighter constituents from the sink or heavier constituents of the material takes place in the zone of the line X—Y, in which the spiral elevator operates to lift the material and into which zone the raw material is fed and sized to fill the space created by such lifting of the material. Although the screw elevator and the feed chute 55 revolve continuously during the operation of the apparatus, the lifting of the material by the spiral elevator and the feeding of the raw material through the feed chute 55 take place intermittently at each point around their orbit, so that these operations take place in sequence around the orbit. A sufficient time interval is thus afforded for the performance of these operations. The main air flow substantially along the line X—Y, after passing of the feed chute 55, flows into the space occupied by the raw material below the spiral elevator, part of this air flowing upwardly through the fine perforations in the elevator which are sufficiently small to intercept dust, the remaining diagonal air flow blowing the fines from the interstices between the larger pieces filling the space under the elevator. The dust thus removed is intercepted by the dust proof blanket 50, the dust in turn, intercepting the next larger size fragment and this action proceeding, resulting in sizing the material along the diagonal path X—Y, the sizes being graduated from the smallest at the upper end and the largest at the lower end of this path, this sizing action being restricted from above by the perforated portion 49 of the elevator and from below by the mound of previously processed material. The sized formation of the mound is fixed by the lateral split of air through the mound. As the spiral elevator rotates, it slides from beneath the lifted material and deposits similarly sized and more or less processed material over the now sized raw material, and the sink and float action of the air pulsations proceeds through the sized raw material positioned within similarly sized more or less processed material.

The time interval provided for the steps of the separating process, the rate of entrance of raw material, rate of discharge of the heavier constituents or impurities and the rate of discharge of the lighter constituents or desired products are governed automatically in accordance with variations in specific gravity of the raw material, thus coordinating the separating action with the impurity variation in the raw material. Thus, increases of specific gravity in the raw material increase the weight of the material in the chamber 46 tending to swing the adjacent end of the balance beam downwardly until it is balanced by the pendulum weight 71. Such movement of the balance beam operates the controller 112 to reduce the speed of the motor 80 which rotates the spiral elevator 40 and feed chute 55 whereby the discharge of the lighter constituents or desired material and the entrance of raw material are reduced. Also, descent of the chamber 46 and the separating chamber lowers the valve plate 14, thus opening the lower end of the conduit 5 for the discharge of the heavier impurity, according to the extent of descent of the chamber 46, and thereby compensating for the increase of the heavier impurity in the raw material fed into the separating chamber. Reduction of the speed of rotation of the spiral elevator and feed chute increases the time elapsing between the entrance of raw material and its removal upwardly by the spiral, at each point in the orbit in which the elevator and feed chute operate, thus affording more time for the performance of the separating operation as the impurity increases. The range of the process may thus be extended to a wide range of density variation of raw material such, for example, as those mixtures in which coal predominates to mixtures in which the impurity predominates.

Discharge of heavier constituents or sink from the discharge conduit 5 relatively to the entrance of raw material enables the raw material to move into the most favorable position for the separating action. As heavier constituents are discharged, the mound of material formed below the spiral elevator and supporting the sized raw material descends, carrying with it the sized raw material into the sink and float zone in which the material separates under the influence of the modified buoyancies existing in the diagonal sink and float zone. The sink and float move away from each other at substantially right angles to the diagonal X—Y, as indicated in Fig. 9, the air currents and material flows being directed toward their respective destinations. As the only point of contact between the sink and float is in the diagonal separating zone of varied buoyancy in which the light and heavy materials are separated in sized relations, and they are carried in such sized relations toward their respective discharges, without merging into density layers, frictional rubbing of float over sink or other intermingling which would produce middlings is avoided. The present invention enables float to be removed as float at one discharge and sink to be removed as sink at another discharge, two products being thus obtained which are split sharply at the specific gravity desired and separated through all size ranges of the raw material treated. All the valuable or desired product is thus recovered and all the impurity or undesired material is separated therefrom so that it can be discarded.

Any tendency toward a departure from the normal buoyancy which produces the desired separation effects automatically a variation of the intensity of the air flow into the separating chamber whereby the buoyancy is restored to normal and is maintained at the exact adjustment required for the desired separation. As previously described, the spiral elevator 40, 41 is mounted revolubly on ball bearings 44 or other anti-friction bearings which reduce friction to a minimum, so that the torque required to rotate the elevator is determined essentially by the frictional resistance to the rotation of the elevator in the buoyant bed of material, and consequently such torque will vary in accordance with variations in buoyancy of the bed of material. Such variations in torque required to rotate the elevator react as a variable tension upon the tight or pulling side of the belt 88, tending to pull the lower idler pulley 90 upwardly more or less against the action of the weight 103 and to rotate the pulley 91 to the shaft of which the air control valve 95 is fixed. As the resistance to rotation of the elevator increases, due to an increase in the ratio of heavy constituents in the mixture of raw material which diminishes the buoyancy of the sink and float, the resultant increase in upward pull on the lower idler pulley 90 will rotate the valve 95 in a direction to open it and thereby increase the amount of air supplied to the separating chamber, thereby thinning the buoyant bed of material and restoring the buoyancy to the exactness to which it is adjusted to produce splitting at the desired specific gravity; and when the resistance to the rotation of the spiral elevator is reduced by an increase in the ratio of lighter constituents in the mixture of raw material which increase the buoyancy of the bed of sink and float, the weight 103 acts on the pulley 91 to close the valve 95 and thereby reduce the amount of air supplied to the separating chamber until the frictional resistance to the rotation of the elevator is balanced by the weight. The splitting point is thus maintained constant through a wide range of variation of the relative amount of light or heavy constituents forming the material operated upon. The splitting point may be set to take place at any desired specific gravity by adjusting the amount of the weight 103.

If desired, the pressure within the interstices of the material may be increased by weighting the air resistant blanket 50 so that it floats on the surface of the material at an increased surface pressure, thereby increasing the air pressure within the material, the resulting increased pressure causing all of the bed of material to be raised, loosened and lifted as a unit over a wide size range from which some of the smaller sizes have been removed. In this manner, the reduced weight of the bed of material and of its resistance to the air flow therethrough, due to the absence of the fines, are compensated for by the action of the weighted blanket floating on the surface of the bed of material, thus enabling the same air action and separation to be obtained as that produced by the fines floating upon the larger fragments of material under a lighter blanket. If desired, a dust hood 120 composed for example of an air pervious, dust proof cloth, may be fitted over the top of the separating chamber to intercept and retain any dust that may escape past the blanket.

According to the present invention, the raw material is inserted in partly processed or treated material in the separating chamber substantially on the line X—Y corresponding to the intermediate specific gravity on which the material is split, and as the processing of the raw material progresses, processing is completed in the surrounding material. The processed heavier constituents, such as the impurities in coal, having a higher specific gravity than such intermediate specific gravity descend as sink the flow of which is controlled and proportioned to the amount of sink in the raw material by composite specific gravity variations in the raw material, and the processed lighter constituents, such as coal, having a specific gravity lower than such intermediate specific gravity rises as float the flow of which is proportioned to the amount of float in the raw material by variations in the composite specific gravity of the raw material. The invention thus enables uniformly effective and efficient separation of the raw material operated upon to be attained, and variations in the proportion of float or sink in the raw material are automatically compensated for.

Normal sizing by air flow raises the fines or floats them to a higher position, but by interposing a sloping screen, such as that formed by the perforated centrally upward sloping segmental portion 40 of the rotating elevator beyond the raw material feed chute 55, in the path of the material during sizing, as indicated in Fig. 9, the rising fines are caused to move centrally of the separating chamber under the influence of the diagonally upward air flow instead of rising more or less vertically, and the sinking larger fragments, which sink into the voids left by removal of the fines, are caused to move outwardly down the mound. As the perforated portion of the elevator comes into position above the raw material, the air flow is modified, producing a mild air flow which is effective for sizing, but the material is not sufficiently loosened to cause gravitational separation of the light and heavy constituents. As the elevator passes, the flow of air or fluid in the diagonal path becomes more vigorous in the portion of the chamber unobstructed by the elevator, and this more vigorous diagonally upward air flow accomplishes the gravitational sinking or floating separation of the lighter and heavier constituents in the zone in which all material is sized, as indicated diagrammatically in Fig. 8, the heavier and lighter constituents being separated effectively by an air flow which is modified by the splits to the central air vent 12 and the upper air vents and which is of varied buoyancy graduated to separate each of the sizes of material. Intermingling of the sizes of material in the mound of heavier material and in the upper portion of the body of material consisting of lighter constituents is avoided by the splitting of the main current of air so that part of the air flows laterally through the coarse to the fine material in the mound and discharges through the central air vent and the other part of the air flows through the coarse to the fine material in the upper portion of the body of material and discharges through the air resistant blanket 50 on the surface of the upper portion. The position of the sizes of material is thus fixed, return of the fines into the interstices between the larger sizes being prevented, so that agitation by air impulses separates the light from the heavy constituents without intermingling of the sizes.

The size graduation of the material in the mound takes place in concentric circles of sizes which are fixed in position by the laterally inward flow of air through the mound assisted by the bulge 13 which controls the movement of the mound as a unit toward the discharge conduit 5. Size graduation of the material above the line X—Y is maintained until the material passes beyond the sink and float zone immediately above and below the line X—Y into the upper portion of the body of material, thus assistaing in producing the proper graduations in buoyancy of the constituents along the line X—Y for separation.

The air flowing through constituents of various sizes and various specific gravities produces several distinctive effects upon the material. The modified air flow produced below the screen-like or perforated portion of the elevator beyond the raw material feed chute effectively sizes the constituents laterally and removes the fines from the interstices between the larger fragments without however raising or agitating the mass of material as a whole but allowing the larger fragments to settle into the voids created as the fines move upwardly. The vigorous air flow which takes place in the portion of the separating chamber which is unobstructed by the elevator and is graduated diagonally upward, loosens and separates the sized material so that the heavy constituents sink and the lighter constituents float with a very sharply defined separation line between sink and float as determined by a slight difference in specific gravity between the sink and float, intermingling of sizes of the material being avoided so that the graduated intensity of this air flow graduates its buoyancy for each size and produces a sharp separation of all sizes.

The mild or modified laterally and vertically directed air flows respectively through the mound and the upper portion of the body of material takes place in directions from the graduated sizes, from coarsest to the finest, prevents return of the fines into the interstices between the larger fragments and permits agitation and moving of the sized material without size intermingling. Control of these air flows avoids violent air blasts which would stir up and mix the constituents and prevent a closely defined separation of the light from the heavy constituents.

I claim as my invention:

1. The process of separating materials having constituents of different specific gravities, comprising subjecting a body of such material to a current of a fluid to render the same buoyant, lifting a portion of said body and thereby spacing it above the portion beneath it, feeding a mixture of raw material into the space thus created between said portions, subsequently lowering said lifted portion upon said raw material thus fed, stratifying said raw material, discharging the lighter constituents from the upper portion of the body of material, and discharging the heavier constituents from the lower portion of said body.

2. The process of separating materials having constituents of different specific gravities, comprising subjecting a body of such material to a current of a fluid to render the same buoyant, sequentially lifting and spacing a portion of said body above the portion beneath it, feeding raw material sequentially in an orbit in the space created between said portions of the body, subsequently lowering said lifted portion sequentially upon the raw material fed in said orbit, stratifying said raw material, and discharging the lighter constituents from the upper portion and discharging the heavier constituents from the lower portion of said body.

3. The process of separating materials having constituents of different specific gravities, comprising subjecting a body of such material to a current of a fluid to render the same buoyant, lifting a portion of said body progressively at sequential points in an orbit and thereby spacing said portion progressively above the portion beneath it, feeding raw material progressively at sequential points in said orbit into the space as it is created beneath the lifted portion, lowering said lifted portion at sequential points in said orbit upon the raw material and subjecting the raw material thus fed to the separating action of the fluid, and discharging the separated lighter constituents from the upper portion and discharging the separated heavier constituents from the lower portion of said body.

4. The process of separating materials having constituents of different specific gravities, comprising subjecting a body of such material to the flow of a current of a fluid in a diagonally upward and lateral path to render the body of material buoyant, lifting a portion of the body of material upwardly from the remainder of the body, leaving the portion of the body beneath the lifted portion in the form of a mound, flowing raw material into the space thus created between said portions, discharging said fluid from the upper and lower portions of said body and thereby splitting said fluid current and causing part of said current to flow laterally through the mound of material and causing the remaining main part of said current to flow upwardly through the raw material to remove the fines from the interstices between the larger pieces in the raw material, and discharging the separated lighter constituents from the upper portion and discharging the heavier constituents from the lower portion of said body.

5. The process of separating materials having constituents of different specific gravities, comprising subjecting a body of such material to the flow of a current of a fluid in a diagonally upward and lateral path to render the body of material buoyant, lifting a portion of the body of material upwardly from the remainder of the body, leaving the portion of the body beneath the lifted portion in the form of a mound, flowing raw material into the space thus created between said portions, discharging said fluid from the upper and lower portions of said body and thereby splitting said fluid current and causing part of it to flow laterally through the mound of material and causing another part of said current to flow upwardly through the raw material to remove the fines from the interstices between the larger pieces in the raw material into said upper portion, retaining the fines at the upper surface of said upper portion of the body, and discharging the separated lighter constituents from the upper portion and discharging the heavier constituents from the lower portion of said body.

6. The process of separating materials having constituents of different specific gravities, comprising subjecting a body of such material to the flow of a current of a fluid in a diagonally upward and lateral path to render the body of material buoyant, lifting a portion of the body of material upwardly from the remainder of the body, leaving the portion of the body beneath the lifted portion in the form of a mound, flowing raw material into the space thus created between said portions, discharging the fluid from said fluid current respectively from the upper and lower portions of said body, thereby splitting said fluid current and causing part of it to flow through the mound of material toward a central discharge and to fix the size formation with the fines toward such central discharge and causing another part of said current to flow upwardly through the raw material to remove the fines from the interstices between the larger pieces in the raw material, and discharging the separated lighter constituents from the upper portion and discharging the heavier constituents from the lower portion of said body.

7. The process of separating materials having constituents of different specific gravities, comprising subjecting a body of such material to the flow of a current of a fluid in a diagonally upward and lateral path to render the body of material buoyant, lifting a portion of the body of material upwardly from the remainder of the body, leaving the portion of the body beneath the lifted portion in the form of a mound, flowing raw material into the space thus created between said portions, discharging fluid from said fluid current from the upper and lower portions of said body and controlling such discharges to vary the slope of the diagonal flow of the current of fluid and splitting said fluid current and causing part of it to flow through the mound of material and causing another part of said current to flow upwardly through the raw material to remove the fines from the interstices between the larger pieces in the raw material, and discharging the separated lighter constituents from the upper portion and discharging the heavier constituents from the lower portion of said body.

8. The process of separating materials having constituents of different specific gravities, comprising subjecting a body of such material to the flow of a current of a fluid in a diagonally upward and lateral path to render the body of material buoyant, lifting a portion of the body of material upwardly from the remainder of the body, leaving the portion of the body beneath the lifted portion in the form of a mound, flowing raw material into the space thus created between said portions, discharging fluid from said fluid current laterally through the body of material with sufficient intensity to classify the raw material in sizes graduated from the largest size diagonally upward to the smallest size, causing fluid to flow upwardly through said body with sufficient intensity to separate and stratify the sized material according to differences in specific gravity, and discharging separated lighter constituents from the upper portion and separated heavier constituents from the lower portion of said body.

9. The process of separating materials having constituents of different specific gravities, comprising subjecting a body of such material to the flow of a fluid in upward and lateral directions, lifting a portion of the body of material upwardly from the portion of the body beneath it, feeding raw material into the space created by such lifting of material, reducing the upward flow of said fluid relatively to its lateral flow and thereby classifying the raw material into sizes graduated from the largest size diagonally upward to the smallest size, increasing the intensity of upward flow of said fluid relatively to its lateral flow to separate the sized raw material according to differences in specific gravity, and discharging the separated lighter and heavier constituents.

10. The process of sizing and separating materials having constituents of different specific gravities, comprising subjecting a body of such material to the flow of a current of a fluid in upward and lateral directions and thereby rendering the body of material buoyant, lifting a portion of the body of material upwardly from the remainder of the body leaving the portion of the body beneath the lifted portion in the form of a mound, flowing raw material into the space thus created, dividing the raw material from the material above it, reducing the upward flow of said fluid relatively to its lateral flow and thereby classifying the raw material into sizes graduated from the largest size diagonally upward to the smallest size, surface blanketing the upper portion of the body of material to retain the smallest size, increasing the upward flow of said fluid relatively to its lateral flow and thereby separating the sized material according to differences in specific gravity, and discharging separated lighter constituents from the upper portion and separated heavier constituents from the lower portion of the body of material.

11. The process of separating materials having constituents of different specific gravities, comprising subjecting a body of such material to the flow of a current of a fluid in upward and lateral directions and thereby rendering the body of material buoyant, lifting a portion of the body of material upwardly from the remainder of the body, leaving the portion of the body beneath the lifted portion in the form of a mound, flowing raw material into the space thus created, dividing the raw material from said lifted portion of the body, reducing the intensity of upward flow of said fluid relatively to its lateral flow and thereby classifying the raw material into sizes graduated from the largest size diagonally upward to the smallest size, covering the sized raw material with similarly sized more or less processed material, increasing the intensity of upward flow of said fluid relatively to its lateral flow and thereby subjecting the sized raw material to the separating action of a more vigorous fluid flow, and discharging the separated lighter and heavier constituents.

12. The process of separating sized materials having constituents of different specific gravities, comprising subjecting a body of such material to a current of a fluid in upward and lateral directions and thereby rendering the same buoyant, lifting a portion of said body of material at successive points in an orbit from the portion beneath it, feeding raw material at successive points around said orbit into the space as it is created beneath the lifted portion, dividing the raw material at successive points around said orbit from said lifted portion of the body, reducing at successive points around said orbit the upward flow of said fluid relatively to its lateral flow and thereby classifying the raw material into sizes graduated from the largest size diagonally upward to the smallest size, covering the sized raw material at successive points around said orbit with similarly sized more or less processed material, increasing at successive points around said orbit the intensity of upward flow of said fluid relatively to its lateral flow and thereby subjecting the sized raw material to the separating action of a more vigorous fluid flow, and discharging the separated lighter and heavier constituents.

13. The process of separating materials having constituents of different specific gravities, comprising subjecting a body of such material to a current of a fluid to render the same buoyant, lifting a portion of said body from the portion beneath it, feeding a mixture of raw material into the space thus created between said portions, varying the time period of lifting of said portion of the body and of the rate of feed of the raw material under control of and in accordance with variations in the proportion of heavier constituents in the raw material while the latter is being fed, discharging the lighter constituents from the upper portion of the body of material, and discharging the heavier constituents from the lower portion of said body.

14. The process of separating materials having constituents of different specific gravities, comprising subjecting a body of such material to a current of a fluid to render the same buoyant, lifting a portion of said body from the portion beneath it, feeding a mixture of raw material into the space thus created between said portions, discharging the lighter constituents from the upper portion of the body of material, and discharging the heavier constituents from the lower portion of said body at a rate controlled by and according to variations in the proportion of heavier constituents in the raw material during the feeding of said material.

15. The process of separating materials having constituents of different specific gravities, comprising subjecting a body of such material to a current of a fluid to render the same buoyant, lifting a portion of said body from the portion beneath it, feeding a mixture of raw material into the space thus created between said portions, varying the intensity of said current of fluid under control of and to compensate for variations in the buoyancy of said body during the feeding of the raw material and thereby maintaining said buoyancy substantially constant, discharging the lighter constituents from the upper portion of the body of material, and discharging the heavier constituents from the lower portion of said body.

16. The process of separating materials having constituents of different specific gravities, comprising subjecting a body of such material to a current of a fluid to render the same buoyant, lifting a portion of said body from the portion beneath it, feeding a mixture of raw material into the space thus created between said portions, varying the time period of lifting of said portion of the body and of the rate of feed of the raw material under control of and in accordance with variations in the proportion of heavier constituents in the raw material during the feeding thereof, varying the intensity of said current of fluid under control of and to compensate for variations in the buoyancy of said body during the feeding of the raw material, discharging the lighter constituents from the upper portion of the body of material, and discharging the heavier constituents from the lower portion of said body.

17. A separator comprising a separating chamber to contain a body of material to be separated, said chamber having means for discharging lighter constituents from its upper portion and heavier constituents from its lower portion, a spiral elevator operable in said chamber on a substantially vertical axis and at a level below that of the discharge means for the lighter constituents and above the level of the discharge means for the heavier constituents to lift the upper portion above the lower portion of the material therein, and means operable in coordination with said elevator for feeding raw material into the space created by the lifting of said upper portion of the material by said elevator.

18. A separator comprising a separating chamber to contain a body of material to be separated, said chamber having means for discharging lighter constituents from its upper portion and heavier constituents from its lower portion, a spiral elevator in said chamber below the level of the discharge means for the lighter constituents and above the level of the discharge means for the heavier constituents and movable through the body of material in said chamber to lift the upper portion from the lower portion of the material therein, means operable in coordination with said elevator for feeding raw material into the space in the body of material created by the lifting of material by said elevator, and means for supplying a current of flotation fluid to said chamber to flow in a path in which said elevator and feeding means operate.

19. A separator comprising a separating chamber to contain a body of material to be separated and adapted to discharge lighter constituents from its upper portion and heavier constituents from its lower portion, a segmental elevator rotatable in said chamber at a level below that of the discharge for the lighter constituents and above the level of the discharge for the heavier constituents and operative to lift the material therein sequentially in an orbit, and means rotatable in coordination with the elevator and operative to feed raw material in said orbit substantially at the sequential points of lifting of the material by the elevator.

20. A separator comprising a separating chamber to contain a body of material to be separated and adapted to discharge lighter constituents from its upper portion and heavier constituents from its lower portion, a segmental spiral elevator rotatable on a substantially vertical axis in said chamber at a level below that of the discharge for the lighter constituents and above the level of the discharge for the heavier constituents and operative to lift material therein sequentially in an orbit, and a feed chute for raw material having its discharge located below the elevator between its leading and trailing edges, said feed chute being rotatable in coordination with the elevator and operative to feed raw material into the space created in the material by the lifting thereof.

21. A separator comprising a separating chamber to contain a body of material to be separated and adapted to discharge lighter constituents from its upper portion and heavier constituents from its lower portion, a segmental disk-like elevator rotatable on a substantially vertical axis in said chamber at a level below that of the discharge for the lighter constituents and above the level of the discharge for the heavier constituents and operative to lift the material therein sequentially in an orbit, said elevator being perforated for the passage of fluid upwardly therethrough and the interception of fine material, means for supplying flotation fluid to said chamber in a path in which said elevator operates, and means rotatable in coordination with the elevator and operative to feed raw material substantially at the point of lifting of the material by the elevator.

22. A separator comprising a separating chamber to contain a body of material to be separated and adapted to discharge lighter constituents from its upper portion and heavier constituents from its lower portion, means for supplying a current of flotation fluid to said chamber to flow in a diagonally upward direction therein, a segmental disk-like elevator rotatable on a substantially vertical axis in said chamber at a level below that of the discharge for the lighter constituents and above the level of the discharge for the heavier constituents and in an orbit which is in the path of said fluid current, said elevator being operative to lift the material sequentially in an orbit and to successively reduce the intensity of flow of the fluid current upwardly for sizing and to intensify the fluid flow upwardly for separation, and means rotatable in coordination with the elevator and operative to feed raw material beneath it.

23. A separator comprising a separating chamber to contain a body of material to be separated and adapted to discharge lighter constituents from its upper portion and heavier constituents from its lower portion, means for supplying a current of flotation fluid to said chamber to flow in a diagonally upward direction therein, a segmental conical elevator rotatable on a substantially vertical axis in said chamber in an orbit which is below the level of the discharge for the lighter constituents and above the level of the discharge for the heavier constituents and in the path of said fluid current, said elevator being operative to lift the material sequentially in an orbit and to successively reduce the intensity of flow of the fluid current upwardly for sizing and intensify the fluid flow upwardly for separation, and means rotatable in coordination with the elevator and operative to feed raw material beneath it, the segment of said elevator being movable between the raw material and the lifted material to confine such raw material during sizing separation and to thereby cause sizing of the material to take place in a diagonally upward path.

24. A separator comprising a separating chamber to contain a body of material to be separated and adapted to discharge lighter constituents from its upper portion and heavier constituents from its lower portion, means for supplying a current of flotation fluid to said chamber to flow in a diagonally upward direction therein, a segmental screw-like elevator rotatable on a substantially vertical axis in said chamber in an orbit which is at a level below that of the discharge for the lighter constituents and above the level of the discharge for the heavier constituents and in the path of said fluid current and operative to lift the material sequentially in an orbit, and means rotatable in coordination with the elevator to feed raw material in an orbit beneath it, said elevator being operative during its rotation to modify the fluid current to size the raw material beneath it and to then subject the raw material to a more vigorous separating flow of fluid successively around said orbit and to spread similarly sized partly processed material in an orbit over the sized raw material at the successive points where the fluid flow increases from a sizing flow to a vigorous separating flow.

25. A separator comprising a separating chamber to contain a body of material to be separated, said chamber having means for discharging lighter constituents from its upper portion and heavier constituents from its lower portion, a spiral elevator operable in said chamber at a level below that of the discharge for the lighter constituents and above the level of the discharge for the heavier constituents to lift material therein, means operable in coordination with said elevator for feeding raw material into the space created by the lifting of material by said elevator, and means governed by variations in specific gravity of the raw material for controlling the speed of operation of said elevator and feeding means and the rate of discharge of heavier constituents from said chamber.

26. A separator comprising a separating chamber to contain a body of material to be separated, said chamber having means for discharging lighter constituents from its upper portion and heavier constituents from its lower portion, a screw-like elevator operable in said chamber on a substantially vertical axis and at a level below the level of the discharge means for the lighter constituents and above the level of the discharge means for the heavier constituents to lift material therein, means operable in coordination with said elevator for feeding raw material into the space created by the lifting of material by said elevator, a balance beam supporting said chamber, and driving means for the elevator having speed controlling means governed in accordance with movements of said beam.

27. A separator comprising a separating chamber to contain a body of material to be separated, said chamber having means for discharging lighter constituents from its upper portion and heavier constituents from its lower portion, a spiral elevator operable in said chamber at a level below that of the discharge means for the lighter constituents and above the level of the discharge means for the heavier constituents to lift material therein, means operable in coordination with said elevator for feeding raw material into the space created by the lifting of material by said elevator, means for supplying fluid to said chamber to render the material therein buoyant, and means governed by the buoyancy of the material in said chamber for controlling the intensity of supply of said fluid.

28. A separator comprising a separating chamber to contain a body of material to be separated, said chamber having means for discharging lighter constituents from its upper portion and heavier constituents from its lower portion, a spiral elevator operable in said chamber at a level below that of the discharge means for the lighter constituents and above the level of the discharge means for the heavier constituents to lift material therein, means operable in coordination with said elevator for feeding raw material into the space created by the lifting of material by said elevator, a balance beam supporting said chamber, driving means for the elevator having speed controlling means governed in accordance with movements of said beam, means for supplying flotation fluid to the material in said chamber, and means governed by the torque required to drive the elevator for controlling the supply of said fluid.

29. A separator comprising a separating chamber to contain a body of material to be separated, said chamber having a screen in its lower portion to support material therein and discharge heavier constituents therefrom and for the supply of flotation fluid thereto, the upper portion of the chamber having a rim for the discharge of lighter constituents thereover and having fluid discharge openings below said rim, and means rotatable on a substantially vertical axis in said chamber at a level below that of the discharge for the lighter constituents and above the level of the discharge for the heavier constituents to lift material therein toward said rim.

30. A separator comprising a separating chamber to contain a body of material to be separated, said chamber having a screen in its lower portion to support material therein and discharge heavier constituents and for the supply of flotation fluid thereto and having a fluid discharge passage provided with means for controlling such fluid discharge, the upper portion of the chamber having a surrounding rim for the discharge of lighter constituents thereover and having fluid discharge openings below said rim provided with means for controlling such discharge, and means rotatable on a vertical axis in said chamber at a level below said rim and above said screen and operative to lift material therein and for feeding material to the space created by such lifting of material.

31. A separator comprising a separating chamber to contain a body of material to be separated, said chamber having a screen in its lower portion to support material therein and the supply of flotation fluid thereto and having a fluid discharge passage provided with means for controlling such discharge, the upper portion of the chamber having a surrounding rim for the discharge of lighter constituents thereover and having fluid discharge openings below said rim provided with means for controlling such fluid discharge, means for supplying a current of flotation fluid to said chamber to classify the material therein in sizes graduated from the largest size upwardly to the smallest size, and a blanket on the surface of the material to confine the smaller sizes of the material.

32. A separator comprising a separating chamber to contain a body of material to be separated, said chamber having a conical screen in its lower portion to support material therein and for the admission of flotation fluid, said screen communicating with a discharge for the larger heavier constituents, a screened outlet for fluid and smaller heavier constituents located in the lower portion of the chamber centrally of said screen, the upper portion of the chamber being cylindrical and having a surrounding rim for the discharge of the larger lighter constituents thereover and having openings below its rim for discharge of fluid and smaller lighter constituents, means for supplying flotation fluid to said chamber to render buoyant the material therein, a spiral elevator rotatable on an axis concentric with the chamber and at a level below the discharges for the lighter constituents and above the discharges for the heavier constituents and operative to lift the upper portion of the body of material in the chamber, and means for separately collecting the constituents from the respective discharges.

33. A separator comprising a separating chamber to contain a body of material to be separated, said chamber having a conical screen in its lower portion to support material therein and for the admission of flotation fluid, said screen communicating with a discharge for the larger heavier constituents, a screened outlet for fluid and smaller heavier constituents located in the lower portion of the chamber centrally of said screen, the upper portion of the chamber being cylindrical and having a surrounding rim for the discharge of the larger lighter constituents thereover and having openings below its rim for discharge of fluid and smaller lighter constituents, means for supplying flotation fluid to said chamber to render buoyant the material therein, a spiral elevator rotatable on a substantially vertical axis in said chamber at a level below the discharges for the lighter constituents and above the discharges for the heavier constituents to lift material therein in the path of said fluid, means cooperative with said elevator and operative to feed raw material into the space created by said elevator, and means for separately collecting the constituents from the respective discharges.

JOSEPH W. REED.